US012346309B2

(12) United States Patent
Proctor et al.

(10) Patent No.: US 12,346,309 B2
(45) Date of Patent: Jul. 1, 2025

(54) SYSTEM AND METHOD FOR USING POLICY TO ACHIEVE DATA SEGMENTATION

(71) Applicant: Tranquil Data, Inc., Arlington, MA (US)

(72) Inventors: Seth Proctor, Arlington, MA (US); Peter D. Shah, Somerville, MA (US)

(73) Assignee: Tranquil Data, Inc., Arlington, MA (US)

( * ) Notice: Subject to any disclaimer, the term of this patent is extended or adjusted under 35 U.S.C. 154(b) by 242 days.

(21) Appl. No.: 16/243,011

(22) Filed: Jan. 8, 2019

(65) Prior Publication Data

US 2019/0236062 A1 Aug. 1, 2019

Related U.S. Application Data

(60) Provisional application No. 62/622,683, filed on Jan. 26, 2018.

(51) Int. Cl.
*G06F 16/23* (2019.01)
*G06F 16/27* (2019.01)
*G06F 16/901* (2019.01)
*H04L 9/00* (2022.01)
*H04L 9/30* (2006.01)
*H04L 9/32* (2006.01)

(52) U.S. Cl.
CPC ...... *G06F 16/2379* (2019.01); *G06F 16/2365* (2019.01); *G06F 16/27* (2019.01); *G06F 16/9024* (2019.01); *H04L 9/3073* (2013.01); *H04L 9/3239* (2013.01); *H04L 9/50* (2022.05)

(58) Field of Classification Search
CPC .............................. G06F 16/27; G06F 16/2379
See application file for complete search history.

(56) References Cited

U.S. PATENT DOCUMENTS

| | | | |
|---|---|---|---|
| 9,244,983 B2 * | 1/2016 | Yang | G06F 16/9024 |
| 10,346,626 B1 * | 7/2019 | Pratt | G06F 21/6218 |
| 10,459,664 B1 * | 10/2019 | Dreier | G06F 11/1458 |
| 2002/0016845 A1 | 2/2002 | Palmer et al. | |
| 2010/0088335 A1 * | 4/2010 | Mimatsu | H04L 67/1097 707/E17.032 |
| 2013/0036089 A1 | 2/2013 | Lucas | |
| 2014/0095449 A1 * | 4/2014 | Marwah | G06F 16/21 707/668 |
| 2015/0249703 A1 * | 9/2015 | Little | H04L 67/566 709/201 |
| 2016/0224949 A1 | 8/2016 | Thomas et al. | |
| 2016/0330209 A1 * | 11/2016 | Iacob | H04L 9/0825 |
| 2017/0034217 A1 * | 2/2017 | Anton | G06F 21/6227 |
| 2017/0060574 A1 | 3/2017 | Malladi et al. | |

(Continued)

OTHER PUBLICATIONS

International Search Report from PCT/US2019/012780, dated Mar. 26, 2019.

*Primary Examiner* — Tony Wu
(74) *Attorney, Agent, or Firm* — Morse, Barnes-Brown & Pendleton, P.C.; Sean D. Detweiler, Esq.

(57) ABSTRACT

A system and method for accessing data suitable for controlling user access to data across a shared distributed storage system is provided. The present invention relates to a system and method for a data management service that captures context for accessed data and utilizes the captured context with operational policy to govern user access to the data.

26 Claims, 5 Drawing Sheets

(56) References Cited

U.S. PATENT DOCUMENTS

2017/0236120 A1\* 8/2017 Herlihy .................. G06F 21/57
                                                            705/67
2017/0262551 A1\* 9/2017 Cho .................... G06F 16/9535
2019/0384748 A1\* 12/2019 Roennow ................ G06F 21/64

\* cited by examiner

SYSTEM AND METHOD FOR USING POLICY TO ACHIEVE DATA SEGMENTATION

CROSS-REFERENCE TO RELATED APPLICATION(S)

This application claims priority to, and the benefit of, U.S. Provisional Application 62/622,683, filed 26 Jan. 2018, for all subject matter common to both applications. The disclosure of said provisional application is hereby incorporated by reference in its entirety.

FIELD OF THE INVENTION

The present invention relates to a system and method for controlling user access to data across a shared distributed storage system. In particular, the present invention relates to a system and method for a distributed data management service that captures context for accessed data and utilizes the captured context and data lineage with operational policy to govern user access to the data.

BACKGROUND

Generally, when storing and managing data on shared distributed storage systems, relational database management systems (RDBMSs) centralize user access, and enforce access rules, resulting in a "system of record". The system of record represents the authoritative copy of data and trust in the data through careful management. In particular, database administrators typically provide trust in the data through clearly defined structure and permissions granted with least-privilege in mind.

At present, this level of trust has eroded as more applications and ad hoc users interact with the same data, as data is transformed and replicated, and as new types of data management services are introduced that lack sufficient core security capabilities. That erosion is exacerbated by the rapid pace of data provisioning for development and testing and the equally rapid progression of business rules and data governance requirements that must be translated to running code. These factors are increasingly leading to governance failures, resulting in costly and complex audit processes, privacy breaches, sovereign deployment roadblocks, uncertainty in autonomous systems, etc. Examples of such failures can frequently be found in multi-tenant deployments.

Rules for data governance in a distributed data storage might require isolation between tenants' data, protection of Personally Identifiable Information (PII) across application logic, and clear policies for how to transfer or backup data, or any combination of those, or other relevant factors, as would be appreciated by those of skill in the art. Additionally, autonomous systems would have requirements to show how and why decisions were made and where physical devices and/or software agents interacted to collaborate on autonomous outcomes. Many current approaches to addressing such challenges involve watching audit trails and attempting to catch items out of compliance. Audit trail models place the burden of data management on applications and ad hoc users while failing to capture much of the context in which data is used. As a result, by the time down-stream audit trails are being evaluated, invalid actions have already transpired. Moreover, it may not be possible to see the invalid actions with the data available in traditional audit trails. In other words, an audit is a symptom of the lack of trust in up-stream data management.

More examples of governance failures in distributed data systems are occurring as these services are increasingly run at global scale. Concerns both about where data is physically stored and how the data is treated as it crosses governing boundaries force services to scale back or increase compartmentalization within boundaries. A common example of concerns around data treatment is how individual privacy policies are restricted across governing borders. Even when privacy is not a factor, physical locality may still be a strong concern for administrators. For instance, in financial, regulatory, or energy systems, a large sub-set of data must reside within a physical boundary but some smaller set of data can and should be shared between locales. These types of requirements drive a need for data segmentation similar to what is done at the network layer today, paired with the ability to attach policy to data as it traverses locales.

Existing approaches to these challenges include replicating data between disjoint services, hiding information and relying on developers to respect use of the data. There is no ability, however, for an operator to simply extend the boundary of management and know that their data is being managed correctly. This is true for global service deployment, but also for uses within data centers, hybrid deployments, and federated data management. As storage systems and governance of data on those systems includes more layers and disconnect data at more points, there is an increase in potential for vulnerabilities and fragility within the systems. This places a substantial burden on developers and users of the data to interpret or encode policy, and manage identity and encryption, often resulting in rigid structure at a time when applications are moving toward much more dynamic data modeling.

SUMMARY

There is a need for improvements in the management, segmentation, and the flow of data in distributed data systems for compliance with all governing policies. The present invention is directed toward further solutions to address this need, in addition to having other desirable characteristics. Specifically, the present invention provides a distributed data management system and method governing and controlling data access and data flow for data stored in nodes subject to credential approval used for mapping, propagating and provisioning with respect to data collections and nodes according to a combined collaborative data access policy enforcement implemented and adapted by continually capturing context and data lineage of nodes functioning as points of durability for specific data sets. In particular, the present invention provides a distributed data management system and method that capture context for each data transaction (e.g., read/write) and use the context with clear policy to govern data from the inside out. The present invention provides data governance through the utilization of policy that encodes compliance against which the data is managed, captures context and lineage of data as it is accessed, and implements a least-privilege model applied to actors within the data management system to control the flow of data through policy based decisions. As a result, the present invention provides a system and method for addressing data governance within a data management system in a manner that enables applications to become simpler and more secure than when using conventional data management systems.

In accordance with example embodiments of the present invention, a method for utilizing a combination of policy and context to manage the segmentation of data in a distributed logical service is provided. The method includes initiating, using one or more networked computing devices, the distributed logical service. The distributed logical service includes one or more nodes comprising physically independent processes, the one or more nodes independently associated with a node policy dictating attributes and capabilities of an associated node and managing a record within the distributed logical service. The managing includes creating the record and capturing context for the record at creation, storing the record in a collection at a node and storing the context as a graph node within a context graph structure stored physically separately from the record stored at the node, receiving a request, through the node, for executing a data transaction involving the record, validating, by the node policy of the node, the request for the data transaction, performing the data transaction for the record at the node, and automatically capturing context for the data transaction and storing new context information resulting from the data transaction or a different transaction in the context graph structure. Node policies of the one or more nodes and a captured context of a data transaction limit which target data the one or more nodes can access and which tasks the one or more nodes can perform on the target data, thereby providing a technological improvement over conventional systems that lack the capability to make policy-based decisions about where data "flows" or data segmentation except in a rigid fashion based on data structure, and further lack any capability to track context and lifecycle.

In accordance with aspects of the present invention, the context graph structure is stored and maintained as a first-class data-set. The context can include operator specified fields, or a subset of record data, for defining types of meta-data to capture, the meta-data including at least one of when the data was created, a location of a node of the one or more nodes where the data was created, a time the data was created, and a user that created the data. The transaction can include at least one of creation of a new record in a collection of records, inserting a new record into an existing collection of records, reading the record, and modifying the record. The new context information in the context graph structure can represent a new version of the record or an entirely new record.

In accordance with aspects of the present invention, the method can further include one or more databases comprising one or more collections comprising data records, storing data accessed through the various nodes using one or more data services to store the one or more collections comprising the data records on physical media, each of the one or more databases being associated with a database policy dictating rules for interacting with data stored in that database.

In accordance with aspects of the present invention, the method can include provisioning the one or more databases using one or more networked computing devices. The provisioning can include receiving, by a membership of nodes, a request for a proposed database policy through a node within the single logical service, determining, by the membership of nodes, to allow a new database with the requested proposed database policy, capturing, by the membership of nodes, approval of the new database in a distributed ledger, and providing access to a plurality of nodes within the single logical service for the new database. The requested proposed database policy can include a name, a public key, and initial behaviors for the one or more databases. The one or more database can include one or more collections of data logically grouped by name, wherein the one or more collections each includes one or more records comprising a list of one or more name-value pairs. The one or more collections of data can be mapped to one or more slices to create a physical grouping of the one or more records. The collection of context can be utilized by the membership of nodes according to policies associated with the nodes. The database policy in combination with the node policy can combine to define which data records and what type of data is accessible from each node of the plurality of nodes.

In accordance with aspects of the present invention, the data transaction for the record at the node can be propagated to each of the one or more nodes. The context graph structure for the record can capture historical information about how that record has been created, modified, and/or read.

In accordance with aspects of the present invention, the method can further include provisioning the one or more nodes using one or more networked computing devices. The provisioning can include receiving an instruction to provision, and provisioning an initial node with an initial policy, receiving, from an operator using one or more networked computing devices, an instruction to create and creating a node identity associated with the initial node, and the initial node automatically creating a ledger showing a membership with the node identity of the initial node for storage with the initial node. The provisioning can also include receiving an instruction to provision, and provisioning, at least one additional node with a second unique policy and a second node identity, the at least one additional node transmitting the second unique policy and the second node identity of the at least one additional node to all nodes in the membership, the approval of the at least one additional node, and that node's unique policy by the membership by execution of a distributed consensus algorithm, the at least one additional node receiving approval and entry credentials from the membership, and the at least one additional node creating a copy of the ledger for storage with the at least one additional node. The provisioning can further include each node in the membership automatically updating the membership in their respective ledgers to include the entry credentials of the at least one additional node and establishing, by the at least one additional node, connections to all existing nodes in the membership. A role of the at least one additional node is enforced by the single logical service based on the second unique policy and the initial node and the at least one additional node act as the single logical service with the initial policy and the second unique policy for managing data in a one or more databases. Each of the initial node and the at least one additional node can include a copy of the ledger including the membership. The membership can include an identity and location for each of the nodes within the single logical service. The node identity can be a public key and private key pair. The approval of the at least one additional node can result from a consensus algorithm run by the membership. The provisioning can also include requesting, by an operator of at least one node of the membership, a change of the node policy associated with the at least one node, executing, by all nodes of the membership, a consensus algorithm to approve the requested change of the node policy, and changing, upon approval, the ledger to reflect the change of the node policy. Policies can dictate how data must be governed by nodes enforcing the policies. Policies of nodes can be created in a least privilege model.

In accordance with aspects of the present invention, each of the one or more nodes in the membership can store a copy of the node policies for each other node in the membership. A service defined by the membership can manage the segmentation of data in a distributed logical service by enabling the one or more collections of records to be stored at each of the one or more nodes in the membership, and enabling a transaction node to execute a data transaction comprising accessing one or more records stored at one or more of each other node in the membership or the transaction node executing the transaction. The node policy of the transaction node executing the transaction and the context corresponding to the one or more records can define whether each of one or more target records are permitted to flow to the transaction node, wherein each other node in the membership in a location where the one or more target records are stored sends the one or more target records stored to the transaction node executing the transaction only if the one or more target records are permitted to flow to that transaction node.

In accordance with example embodiments of the present invention, a system for utilizing a combination of policy and context to manage the segmentation of data in a distributed logical service is provided. The system comprises one or more networked computing devices each comprising memory, one or more processors and input/output components. Each of the one or more networked computing devices is configured to initiate the distributed logical service. One or more nodes comprise physically independent processes, the one or more nodes independently associated with a node policy dictating attributes and capabilities of an associated node. A database engine is configured to access and exchange instructions with one or more external data stores or one or more internal data stores, for managing a record within the distributed logical service. Management uses a policy engine configured to create the record and capturing context for the record at creation, store the record in a collection at a node and storing the context as a graph node within a logically separate context graph structure, which may be stored physically separately from the record stored at the node, then receive a request, through the node and transmitted from a user device using a network connection, for executing a data transaction involving the record, and validate, by the node policy of the node, the requested data transaction, by determining whether the requested data transaction complies with the node policy and database policies, which dictates what operations the node can execute and what actions each database can perform. The database engine is further configured to perform the data transaction for the record at the node. The policy engine is configured to automatically capture context for the data transaction and store new context information resulting from the data transaction or a different transaction in the context graph structure. The node policies of the one or more nodes and a captured context of a data transaction limit which target data the one or more nodes can access and which tasks the one or more nodes can perform on the target data.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
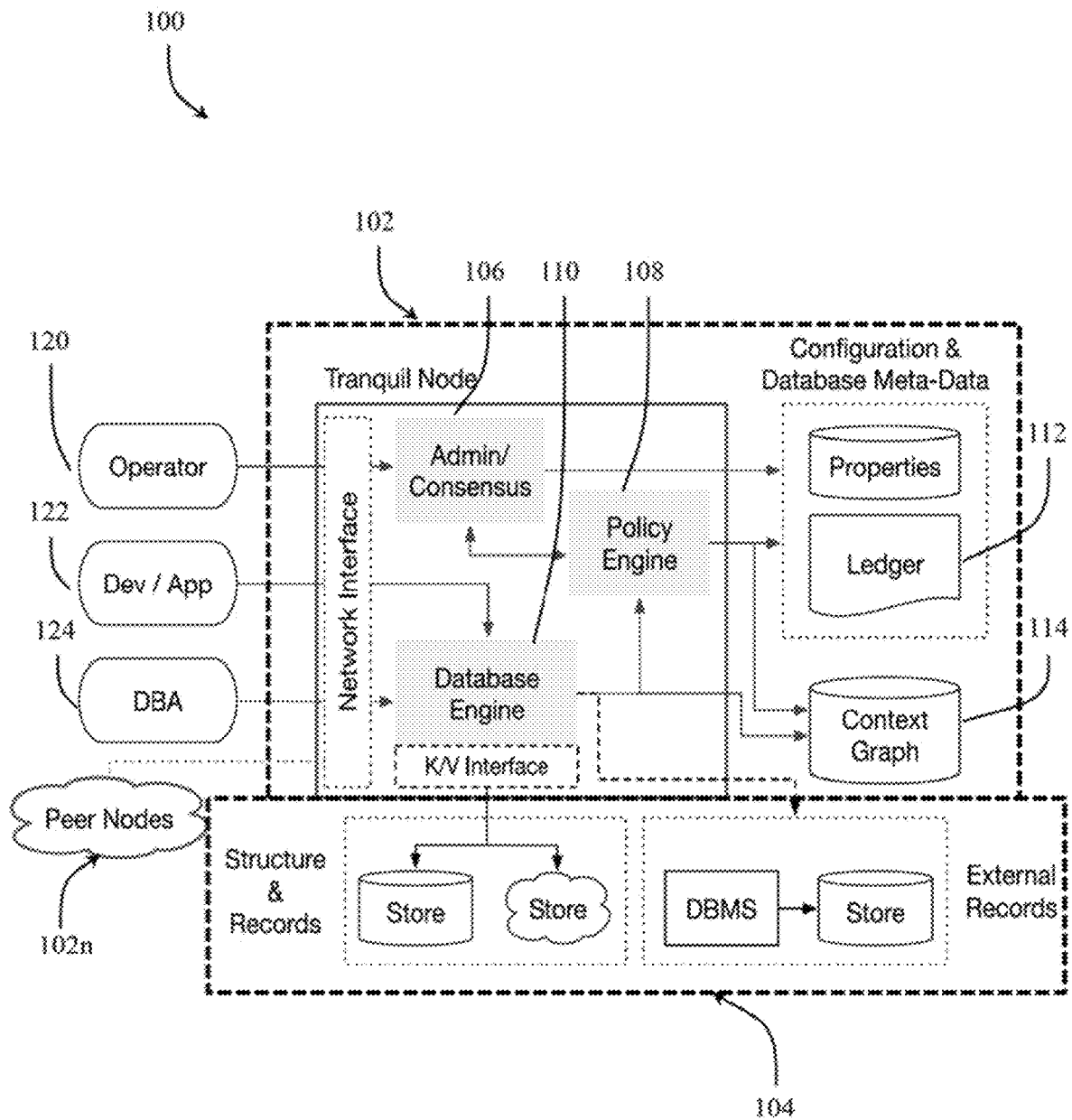
FIG. 1 is a diagrammatic illustration of a system for implementation of the present invention.

An illustrative embodiment of the present invention relates to a distributed data management solution that is designed for simplifying the governance of data for programmers and applications. The distributed data management solution of the present invention includes a plurality of nodes distributed across one or more physical and/or virtual machines. The nodes provide a single logical service for both applications and operation. Each of the nodes operates as independent processes having unique identities, and is associated with one or more databases configured for storing data accessed through the nodes. Additionally, the each of the nodes is associated with a node policy that dictates what data and locations within one or more databases the node can access. In addition to the node polices, the nodes utilize context associated with stored data to determine whether or not particular nodes are permitted to access data.

The nodes are configured to capture context of data on inception and thereafter. Using the captured context as input into operational policies (node and database policies), the present invention controls data access, segmentation, and flow of the data throughout the distributed system and applications accessing the system. In doing so, data is automatically categorized (explicitly and implicitly) in a method independent from application logic, in such a way that the policies can use the contextual data as a first-class data-set. Additionally, access to the data is provided through a least privilege methodology, wherein each node is only allowed to access the minimum set of data which satisfies its policy, and new nodes can only be provisioned with the same, or fewer, privileges as the authorities which create them. More specifically, individual nodes within the system of the present invention collaborate to enforce specific policies for dictating the segmentation and the flow of data, both logical and physical. Taken together, the system provides a holistic model for data segmentation and clear rules about where and how data is allowed to be stored, accessed and co-mingled. From a governance perspective, it may matter both where and how data is stored and also where and why data flowed across a network or within application logic. The present invention provides a unique configuration by which data is stored and accessed within a distributed data storage system for simple governance compliance. The unique combination of steps utilized by the present invention creates a distributed data storage system that is simpler to use, safer, and more resilient than the conventional systems of the current state of the art. The combination of features of the present invention also provides technological improvements not realized by conventional distributed data storage systems. The technological improvements include, but are not limited, to proactive policy enforcement in real time for data management, rather than reactive violation detection through auditing tools, or similar features, providing context as a first-class data-set to enable the construction of future policy-based features and tools in the future, and creating segmentation for data flow to provide implicit separation of data along isolation boundaries.

FIGS. 1 through 4, wherein like parts are designated by like reference numerals throughout, illustrate an example embodiment or embodiments of improved operation for the distributed data management system, facilitated by the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts the core components of the distributed data management system 100 for utilization in accordance with the present invention. In particular, FIG. 1 depicts the data management system 100 including one or more nodes 102 and one or more stores, which each provide one or more data interfaces, such as key-value or RESTful, or ACID interfaces to stores 104. The data stores 104 might be built into, and directly managed by the node 102, or might be external databases connected to the node 102, but managed by external database management systems (DBMS). In accordance with an example embodiment of the present invention, each of the nodes 102 includes an admin/consensus engine 106, a policy engine 108, and a database engine 110. The admin/consensus engine 106 is configured to manage polling when reaching a quorum or consensus between the nodes 102-102n (e.g., when a new node or database is to be provisioned). The policy engine 108 is configured to store and enforce the node policy associated with the node, which dictates what operations that node 102 can execute, and the database policy associated with each of the various stores 104, which dictates what can be done with each database. The database engine 110 is configured to access and exchange instructions (e.g., read, write, etc.), either with the one or more external stores 104, or with an internally managed data store 104, in accordance with database policies.

Additionally, each node 102 (including each peer node 102n) is associated with its own node policy. The node policy is stored locally with the associated nodes and grants the associated node a variety of abilities (via the policy engine 108). In particular, the node policies dictate what data the node can or cannot access. In accordance with the present invention, the node policies are always "positive", such that they state the operations that a node may perform, not the operations that a node may not perform. By default, a node may not provide durability for data within a database, therefore, a very simple policy to a grant a node is the capability to store all database data on-disk. Rather than an all-or-nothing approach, however, policy for a node may also allow it to act as a point of durability for specific data sets. For example, the node policy can dictate that a node is permitted to store data in database "slices" labeled 'US' and 'CA'. In addition to clearly defining the physical location of stored data, however, it may be also important to define where data may flow. Flow, in this instance, means both the ability to request remote data for a local node and/or request a remote node run a data transaction that returns data to the local node. As would be appreciated by one skilled in the art, the node policies can also include negative policies.

The nodes 102 further include local storage for storing management data for the node 102 (e.g., node policy, configuration, etc.). A node may also include storage for storing records managed by the node 102, as part of a local data store 104. In an example embodiment, the nodes 102 either include storage for a ledger 112 including identification information for each of the one or more nodes 102 within the distributed data management system 100 and their respective node policies. Additionally, the nodes 102 include context graph storage 114 for storing automatically obtained context data for any data transactions performed by the node 102, or have a connection to an external graph store 114 to contain context information on behalf of the node 102. For example, when the node stores data on one of the one or more stores 104, the context information for that data transaction will be stored in a context graph in the context graph storage 114.

As would be appreciated by one skilled in the art, the one or more nodes 102 can include any combination of physically independent processes that run on a same operating system (OS) instance (e.g., physical machine, virtual machine, container, etc.) or independent instances across a network. Additionally, each of the one or more nodes 102 in the system 100 can be constructed from the same code, and therefore is capable of performing the same tasks. As a matter of policy, however, some of the one or more nodes 102 may be limited in the actions they can take or the data upon which they can act. To determine which actions the node can perform and upon which data nodes can act, the nodes 102 utilize the policy engine 108 to follow an associated node policy that indicates the attributes and capabilities for managing at least data access to the one or more stores 104.

In combination, the engines 106, 108, 110 provide a logical service for both operational and database access while enforcing strict separation of duty between the two roles. As would be appreciated by one skilled in the art, the engines 106, 108, 110 can include any combination of hardware and software configured to carry out the various aspects of the present invention (e.g., governance of data over a distributed data management system). In accordance with an example embodiment of the present invention, operational tasks are managed by system operators 120. The operators 120 are allowed to manage the one or more nodes 102 and their associated resources, including policy, membership, storage configuration, etc. In particular, the nodes 102 are configured to provide access to operators 120, and other user entities over a network interface, as depicted in FIG. 1. In accordance with an example embodiment of the present invention, software applications are created and managed by software developers. These applications carry out tasks that are unrelated to the invention, but require access to data managed by nodes 102 to perform those tasks. Also in accordance with an example embodiment of the present invention, database administrators (DBAs 124) would be responsible for managing the structure, and presentation of data accessed by the applications, but not the policies which govern it.

The operators 120 are also enabled to provision the one or more stores 104 accessed by the one or more nodes 102, such that the operators 120 manage the mapping of the physical infrastructure within the system. The operators 120, however, are isolated from the content of any given database, which is managed by the DBAs 124, and accessed by the developer applications 122. This configuration serves as a separation of duty where actors who defined and manage policy on the system 100 cannot also affect the content stored therein. As such, each of the one or more stores 104 is a logical, independent collection of data that is serviced and managed by one of the one or more nodes 102. As would be appreciated by one of skill in the art, the one or more stores 104 can include any combination of storage devices configured to store and organize a collection of data. For example, the one or more stores 104 can be a collection of storage devices on a single computing device, a collection of storage devices at a remote database facility, or a cloud computing storage environment.

In accordance with an example embodiment of the present invention, each of the one or more stores 104 is made up of one or more collections. The collections are a logical construct, or grouping of data organized by name, with each of the collections containing one or more records represented by a list of one or more name-value pairs. The database records are created by the content created by users accessing the database. Each record may be mapped to a slice (a physical representation) based on the database policy storing the record. As would be appreciated by one skilled in the art, the records may be stored and managed by the system 100, or may be stored and managed by another underlying database system. In an example embodiment, each of the one or more stores 104 maps data from the records to one or more slices in a physical grouping of the records such that each record exists in exactly one slice within a database. Additionally, the slices can include records from multiple collections. Similarly to the node policies, database policy associated with each database dictates the rules for how data is mapped to context and/or slices.

In accordance with an example embodiment of the present invention, when a record is created, an associated collection of context is also created and stored in a context graph storage 114 of the accessing node 102 (the node creating the record). In particular, the collection of context for each new record is created as a new graph node within a lifecycle graph stored in the context graph storage 114. Additionally, each graph node maintains its own copy of some or all of the records and the collections of context associated with the records. In other words, each of the graph nodes created within the lifecycle graph represents a transaction that occurred involving the record data associated with the graph. The context data comprising a collection of context is an automatically generated data-set that captures meta-data about the record data (e.g., who created the data, when the data was created, where the data was created, specific, operator-defined fields, etc.) and the context graph or lifecycle graph resulting from the context data is a first-class data-set that represents inception and evolution of data and how that data interacts. Additionally, the context graph is a backend process invisible to users and is logically distinct from the ledger 112 and the stored record. The unique combination of the nodes 102, associated node policies, and the captured context stored in the context graph provide the improved segmentation and data flow control of the present invention.

Figure 2A:
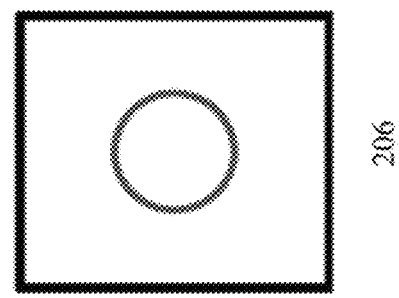
FIG. 2A is an illustrative example of provisioning a node in accordance with the present invention.
Figure 2A:
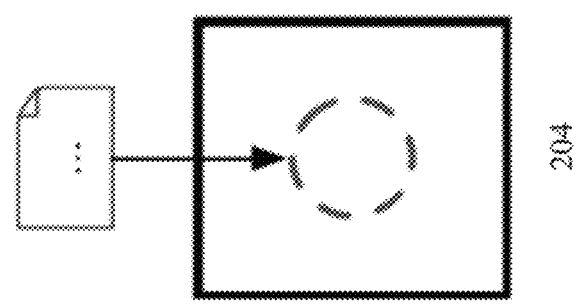
Figure 2A:
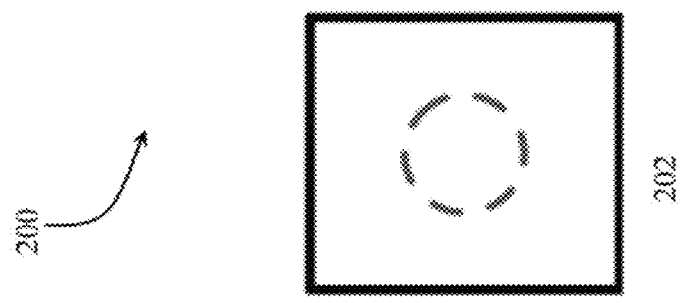

FIG. 2A depicts an initial setup process 200 of the first node within the system 100. Upon the initial setup of the system 100, settings for the one or more nodes 102 must be configured. At step 202, a host machine (physical or virtual) has the operating software for the system 100 installed thereon. During installation of the system 100, the properties for the one or more nodes 102 are setup in a node configuration file. In an example, the node configuration can be an editable file that is stored directly on a local filesystem (e.g., specifying data directories, cache sizes or logging configuration) utilizing the system. Using the node configuration, a first node can be provisioned/created. At step 204, to provision an initial node in the system 100, an operator (or autonomous agent acting as an operator) first creates an identity for the node (e.g., a public/private key-pair) and associates a policy with the node. When no initial node has been provisioned within the system 100, the request for first node is simply allowed into the system 100 because there are no other nodes to query for approval. At step 206, the process 210 depicted in FIG. 2B is initialized.

Figure 2B:
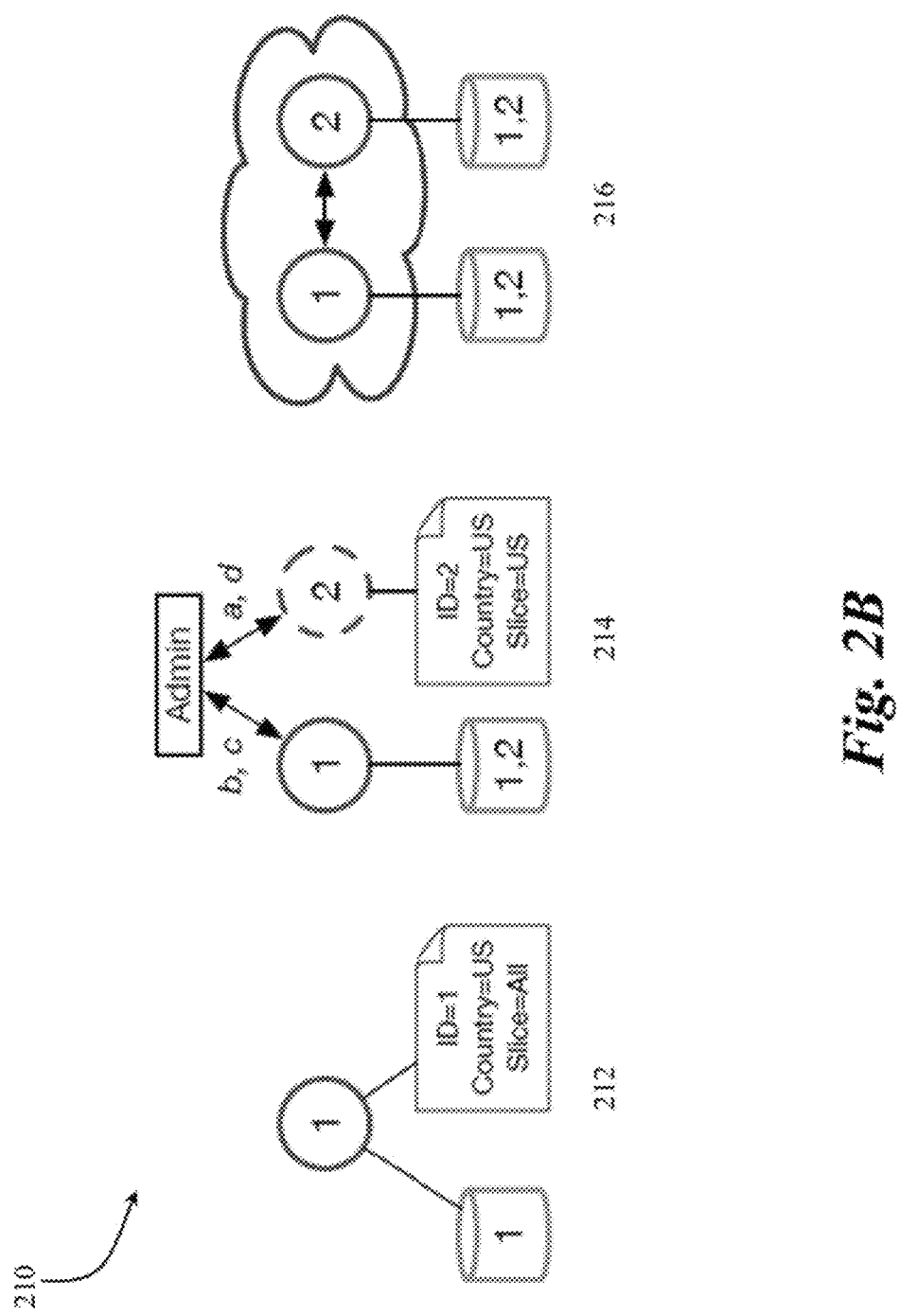
FIG. 2B is an illustrative example of provisioning additional nodes in accordance with the present invention.

At step 212 of FIG. 2B, the initial node is provisioned with a node policy, as performed in the process 200 depicted in FIG. 2A. The result of the initial node being provisioned is a system 100 with a single node member operating thereon. Thereafter, the first node records its own identity and policy within its ledger 112, which will be shared with any subsequent nodes that join the system 100. In particular, the first node initializes a ledger 112 on local storage writing the membership of the one node with the identity (e.g., ID=1) and policy of the node associated therewith. The resulting ledger 112 provides a logical data-set that will capture all allowable behavior for each of the nodes in the system. The ledger 112 also supports reasoning about the policy associated with the logical service. Other than bootstrapping the initiation process, there is nothing "special" about that first node, it behaves like all other nodes that will be provisioned within the system 100, and can be de-provisioned at any point without affecting the functionality of the overall system 100.

At step 214, an operator 120 requests that a new node with a new policy be provisioned within the system 100. The request is transmitted with the policy and a unique node identity (e.g., ID=2) for the new node to the members of the system 100 (e.g., the initial node ID=1). The request for approval of the new node triggers execution of a distributed consensus algorithm (e.g., practical byzantine fault tolerance (PBFT), reliable, replicated, redundant, and fault-tolerant (RAFT) or PAXOS) that transmits the identity and policy of the node to all existing nodes (e.g., via the consensus engine 106). Thereafter, the previously provisioned nodes within the system 100 will compare the identity (e.g., ID=2) and policy of requested new node against all existing node identities and policies (e.g., in the ledger 112) to determine whether there is no conflict.

In accordance with an example embodiment of the present invention, each of the nodes will compare the node identity and policy against all node identities and policies stored in the distributed ledger 112. If the consensus of the existing nodes is that no conflict is found and the proposed policy is acceptable, then the requesting node identity and policy are stored in the distributed ledger, thus memorializing the node and associated policy for the other nodes. Thereafter, at step 216, the new node establishes connections to the existing nodes and its role in the system 100 will be enforced based on its policy, so that (among other aspects) the other nodes will know what parts of a given database should or may not be shared with the new node. Thereafter, the two nodes in FIG. 2B will act as a single, logical service with both nodes having the same data in their individual copies of their ledgers 112 (e.g., each including both nodes identities and policies). In accordance with an example embodiment of the present invention, in similar process, to change a policy associated with a node, an operator must run the consensus process again, which again results in an immutable record of the change in the distributed ledger.

The node policies of the present invention differ from policies in conventional systems because decentralized policies providing express privileges are granted directly to each of the individual nodes of the system 100. The node policies dictate the capabilities and requirements of specific databases, rules for interacting with specific records and conventional access models for users (applications). Because these are all expressed in a common form and within a logical system, and because a formal, hierarchical policy language is used, the result is a single, logical policy that expresses all of these concerns in a way that allows global comprehension, global enforcement of compliance, and the ability to understand the impact of making changes to a running system. Further, this logical policy (achieved through a formal hierarchy) defines a clean mapping between both the application-specific notions of data models (e.g., schemas) and physical aspects of a distributed system, which enables a segmentation model (discussed in greater detail herein) and integrity of the data model as a whole. In other words, the node policies stored across the one or more nodes 102 will create a global view of node and database policies. Utilizing the node policy model of the present invention, developers are no longer burdened with encoding policy inside application logic (a typical source of security flaws and project delays) to meet compliance requirements. Additionally, by normalizing this policy model, the framework is in-place to be proactive in ensuring compliance, instead of being reactive and retroactive in action.

The benefits provided by the proactive policies of the system 100 of the present invention are not achievable through conventional systems and methods because typical "policies" are often simple access control lists, rigid rules defining authorized actions, or configurations dictating how to install and monitor a system's components. They are often decomposed such that the total logic can only be seen by looking at application code, filesystem permissions, user groups and roles, LDAP entries, PKIs, etc. From this perspective, it is difficult to get a holistic view of what a given user is allowed to do, understand the effects of a local change in a global context, introduce new content and functionality, etc. It is common for application policies to be able to speak to users and data access within an application but typically not to resource management, cross-application access, or physical data residence. The opposite is true of resource orchestration policies. There has been some minimal effort to create general-purpose policy services to normalize policy definition within and across applications and resources; however, these are typically very difficult for developers and operators to work with and too abstract to map to application-specific requirements, making adoption slow (at best) in spite of their power and expressiveness. The policy mechanism provided by the system 100 provides a unified mechanism for providing comprehensive policy control over data. Furthermore, encoding and storing the policy independently of application logic greatly simplifies the process of defining policies, and eliminates the need to repeat the same policy logic in multiple applications. This also prevents errors in application logic from resulting in violations of operator policies.

Figure 3:
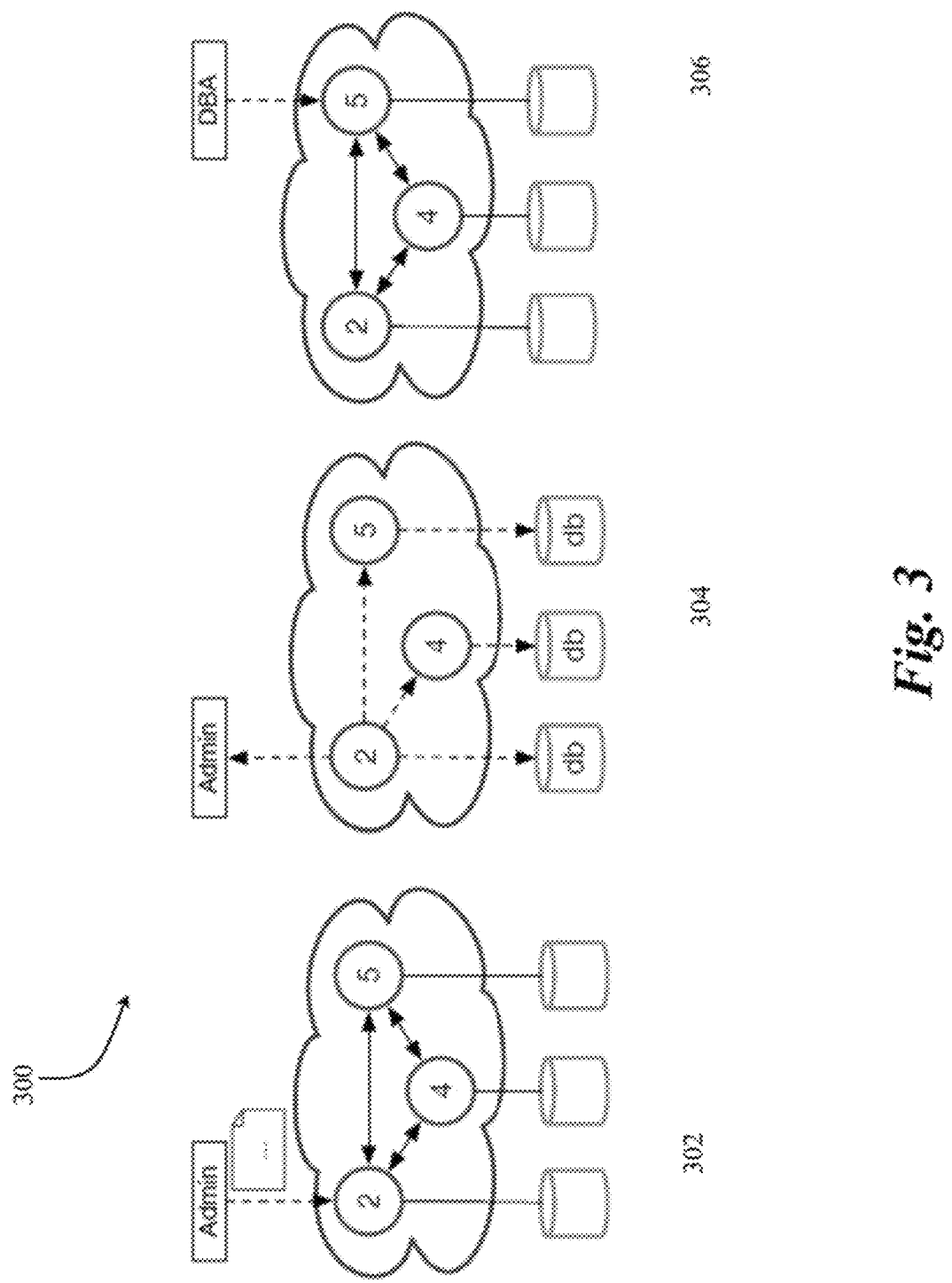
FIG. 3 is an illustrative example of provisioning a database in accordance with the present invention.

Continuing with FIG. 1, each of the provisioned nodes 102 is associated with the one or more stores 104. In accordance with an example embodiment of the present invention, the one or more stores 104 are each associated with a database policy and can be provisioned in a similar manner as the one or more nodes 102. FIG. 3 depicts a process 300 for provisioning a database within the system 100. At step 302 an operator 120 submits a request to the logical service provided by the system by selecting a node and transmitting a proposed database policy to the node for approval. In one example, the request can include the database name, a public key for the DBA 124, who will administer that database, and any initial database behaviors. At step 304, upon receiving the request to provision a new database, the node will submit the request to the one or more nodes 102 (e.g., via an admin/consensus engine 106) for a consensus acceptance. Each active node within the one or more nodes 102 will compare the policy of the requested database against the node polices (and database policies) to ensure that the operation is allowed (e.g., is the proposed database policy acceptable with the node policies). When a consensus is reached, the ledger is updated with metadata for the new database and associated database policy and notifies the requesting operator 120. At step 306 the new database will be configured to connect with any of the one or more nodes 102 within the system 100 and will operate under the database policy provided in the request. The database policy will dictate what type of data may be stored on the database as how it may be accessed. In combination, database policies and node policies determine which data records may be accessed from each node, and what type of access should be permitted to that data. For example, all records of a particular collection on the database may be required to include a specific named field, or fields, and only accessed by nodes whose node policies restrict access based on the value of that field.

In operation, initially, a non-operator user 120 (e.g., a developer, database administrator, etc.) creates data in one of the stores 104 by inserting one or more records into one or more collections within the database. While the system 100 is active, context data is captured by the nodes 102 every time a data transaction is executed within the system 100 including the initial creation of the data. For example, when data is created and stored within the system 100, the location (e.g., node identity), time, user, etc. can be stored in the context graph storage 114. The same context information can be captured on data access. When multiple records are created or accessed in the same transaction that is also noted, and when records appear to have relationships that is also captured in the context. By documenting data transactions (e.g., in context graphs), immutable metadata is created that can be used in policy enforcement in the future even if the original content of the database has changed. In an example embodiment, the documented data transactions (e.g., context graph) are physically hidden from users of the system 100 and are only available to the policy engine 108, providing policy evaluation the rich details it needs as input to express simple policies while ensuring that sensitive information cannot leak to applications or users. In an example embodiment, an interface could be provided to ask questions directly of this graph in a fashion that ensured anonymity.

In accordance with an example embodiment of the present invention, documentation of each data transaction will be maintained by each node 102 within the system 100. For example, when there is a single node in the system, all the data activity happens at that node and therefore where all data is recorded with the single node. Similarly, when the system 100 scales out to a plurality of nodes, activity is shared across all nodes as is the data involved in the activity. Thus, the model of the system remains the same with one or many nodes. As a result, recorded data transactions provide an immediate, "up-stream" capture of the context needed to make intelligent governance decisions about data over its lifespan, resulting in a first-class, programmable model for that data as input to the policy engine 108, enabling proactive policy-based management. Additionally, the data tracking enables an ability to capture some specific subset of the content and map it to immutable context that can inform policy decisions, without involving developers or application logic.

During operation, the one or more nodes 102 are provisioned in a fashion that enforces specific policy and establishes a basis of trust. In particular, the nodes 102 and their associated node policies dictate what data can be accessed by who and/or and where the data can be stored based on their respective node policies. In an example embodiment, the node polices can utilize context associated with a data transaction to achieve data segmentation. In particular, the node policies, along with database policies, are used to capture context, categorize records into slices and then define where the associated data may be stored and whether certain data can be accessed. While the inserted records have no imposed structure, the fields within the records may have meaning to the operational policies of the system (e.g., node policies or database policies). For example, given two records, A1 and B1, created by user A, and user B, respectively, a node policy may permit any transaction to read or modify either record, but deny any transaction which attempts to read or modify both records at the same time. This type of policy is critical to the idea of data isolation, which is a useful application of the invention. For example, an application for such data segmentation is in legal/privacy compliance, where it may be forbidden for the data of two users to be co-mingled in any computation (e.g., HIPAA, GDPR, etc.).

Additionally, the system 100 can leverage logical context and physical slices to control the movement of data throughout the system. Specifically, utilizing the features of the present invention, access to collections, and the resulting flow from the physical location of the collection to the requesting node, can now be managed directly by operators with no impact on developers. This breaks the model of a conventional logical data management system, which has limited ability to segment data except in a rigid fashion based on data structure, or a shared design which requires exposing tight coupling with infrastructure deployment/management to developers. Most distributed infrastructure is not able to make data segmentation decisions because network segmentation is managed at the layer of the network itself and can only make segmentation decisions based on the layout of physical infrastructure. Thus, such systems cannot segment the information of a logical dataset within a single application. In order to support an ad hoc segmentation model of the data, that data is typically split into physically separate collections (e.g., disk volumes). In contrast, the present invention supports a logical model, independent of specific infrastructure or deployment and orthogonal to physical storage strategies, such that it supports the same notions of segmentation with a clear model for handling failure. Additionally, the present invention does so in an automated fashion because of the use of policy driven by context.

By making the policy and context models operational, as provided in the present invention, application development becomes simpler and more secure. It also enables (for the first time) the ability to decompose monolithic application logic into multiple services and codebases, written in multiple languages, with the ability to enforce a common trust and compliance model on the data. The policy-defined model for extracting structure from data for use in policy is a key enabler to separate developers from operational tasks. The inter-relationship of data in that graph is what allows simple data segmentation and supports the ability for non-technical users to write simple policies about data governance.

These governance benefits provided by the system 100 (e.g., data segmentation, controlling data flow, etc.) are not achievable through conventional systems and methods. For example, conventional compliance rules often require keeping audit trails for specific pieces of a data-set (e.g., modifications to tables that contain sensitive data) or for the actions of specific users. While the structure of that information can range, it is typically modeled as a log (sometimes physically as a log file on-disk) with ordered but disjoint entries. As with policy management, it often requires combining logs from multiple applications and services to reconstruct the context of any given record or action, and often too much of the context was never kept making that reconstruction difficult. Typically, these logs only capture "active" events, like the creation or modification of data, and therefore can't react to passive actions like reading records or scanning tables and these logs contain minimal or no details about the content of data for security reasons. Because much of the initial context has been lost at this point in the analysis these conventional tools need to draw on many sources, and increasingly are applying machine learning in an attempt to re-construct some of the lost details. Additionally, there has been a trend in a different direction towards reducing or removing policies and instead training systems to recognize patterns of invalid or suspect behavior. Both approaches are helpful as security tools, trying to catch attacks or simply protect against misconfigured services or invalid application logic. Neither methodology, however, protects against exposure or policy violations, and in most cases, both are reactive to specific events in time and unable to understand the long-term evolution of how data is connected and correlated.

In accordance with an example embodiment of the present invention, the combination of node and database polices and data context capturing provides segmentation for data flow. In particular, when utilizing the system 100 of the present invention, applications and users have no visibility into the physical model so that data flow can be managed against policy without impacting any given application. This is done by giving operators 120 the responsibility for defining which elements of content are captured as context, and which collections of information should be mapped to which slice(s) within the one or more stores 104 (a physical sub-grouping of the logical data-set). Additionally, the operators 120 define the individual policies associated with each of the one or more nodes 102. Among other aspects, these policies determine which slice(s) may be physically stored or accessed at each node and, based on context, which subsets of information may or may not flow into that node. This maintains the model of a single logical service and data-set while running as a physically distributed solution. The functionality provided by the present invention provides the same goals of network segmentation by using the policy model and context inputs from above to simplify the process of identifying subsets of application data independent of application logic. Unlike in conventional systems, it is now possible to reason about not just where data is stored, but where data flows and ensure, in a proactive manner, that those flows are compliant with all required policies. As a result, the present invention provides an operational model for segmenting application data without application visibility, physically managing the storage, flow and use of that segmented data without having to run separate, disjoint services with replicated copies of data, and using policy and context to ensure proactive compliance of data flow with minimal user-intervention.

In the data world, these concepts do not exist in such a concrete fashion, and the tools that do exist often expose segmentation directly to applications. The goal in conventional systems, that provide segmentation, are focused on performance and durability rather than data flow compliance, and typically only address where data is kept on-disk and not where or how information may flow through the system as a whole. To manage the flow of information between servers or sites, the typical approaches are designed to maintain separate databases and replicate information, often hiding, modifying or removing subsets of data intransit, increasing complexity, decreasing safety and losing the advantage of a logical data-set. To compensate, additional tools are used to help track the fact that entries in different databases are in fact the same, and attempt to compensate when a change happens in only one copy of the data. In other words, conventional database storage systems and methods cannot make policy-based decisions about where data "flows" and do not have any capability to track context & lifecycle. By capturing data context, and using it to inform a proactive policy model the system 100 has enough information to provide these features without further input from applications or other, external inputs.

Example data flows for a user utilizing the system 100 of the present invention are provided below, however, the examples are not intended to limit the scope of the present invention and are for exemplary purposes only.

A first example is the data flow when a user wants to interact with data in a database (e.g., database 104). This data flow would be an initial data flow for any operations a user wants to perform within the system 100. Initially, a user establishes a network connection to a node (e.g., node 102). In accordance with an example embodiment of the present invention, the user would communicate with the node using a well-known data access protocol. To establish a connection to the node, a request is transmitted from the user device, including the database the user desires to access and the requested operation, to the node. To establish a connection to the database, the policy engine 108 of the node determines whether the connection is allowed based on the information provided from the user request, such as the identity of the user, the type of data record to be accessed, or the type of access to be performed (e.g. read vs. write, etc.). If the user is permitted access, then the user is able to access and store data within the database according to the node and database policies. Otherwise the user is denied access.

A second example is the data flow when a user wants to create a collection within a database. Initially, a user transmits a request to the database engine 110 within the node 102 to create a new collection. The database engine 110 validates the request with the policy engine 108 to determine whether the request complies with the node and database policies associated with the request. If allowed, a data structure for the collection is created in the data store of the database 104 and the policy engine 108 creates corresponding entries in the context graph storage 114 of the node 102. Specifically, the node 102 records the context of the new collection data structure and saves the context in a new graph node within the context graph storage 114. In one example, the context and graph node capture where the request was made, who made the request, what collection was created, and based on policy other aspects at inception. The creation of this graph node is a backend process such that it is opaque to both the user and the database engine 110. Additionally, in an example embodiment, the new graph node in the context graph is not durable and visible until the calling transaction successfully commits, and if the transaction fails then the graph node will be removed from the context graph storage 114.

A third example is the data flow when a user inserts a record into a database. After at least one collection has been created, a user may insert any number of records into the collection. As in the previous example, the request is submitted to the database engine 110 which consults with the policy engine 108 to validate whether the requested operation is allowed. This request can include details of the request and the content of the record. Again, as in the previous example, if the request is allowed the policy engine 108 will capture the context of the added records and enter an update to the context graph with a new graph node and is propagated to the other nodes. Additionally, the record is written to the record store on the database. Otherwise, if the request does not meet the node and/or database policies, the user is denied access to write records to the collection.

A fourth example is the data flow when a user requests to read a record. Upon a node receiving a request to read a record, the database engine 110 consults the policy engine 108. The node will create context information for the request and store the context in the context graph storage 114. In particular, depending on the node and database policies, the request may result in new graph connections (e.g., lines) connecting graph nodes together and/or it may result in updating properties on a given node (e.g., a count of the number of reads) and is propagated to the other nodes. Unlike the example of writing to a record, context information for read requests is stored immediately regardless of whether the calling transaction commits, because even the results of an unsuccessful request may provide information about the contents of the database to the user. Assuming the request is allowed then the requested record is retrieved (e.g., by using a primary key in an index or searching for terms in a dictionary or catalog) for display to the requesting user.

A fifth example is the data flow when a user requests to modify a record. Context data in this system is immutable, so modifications are, in actuality, the act of creating new versions. As discussed in previous examples, when a node receives a request to modify a record, the database engine 110 queries the policy engine 108, which will create a new provisional graph node in the context graph associated with the target record and the change is propagated to the other nodes. The new provisional graph node will represent the transition from the previous version of the record (prior to modification) to the new version (the modified version). If the modification is allowed, the database engine 110 will update the new record data within the database.

In an instance of the system 100, where there are multiple nodes 102, for example, in a multiple node system 100, when a request for a new node or database to be provisioned or a request for a data transaction (e.g., read, modification, create, etc.) is received, the one or more nodes (nodes 102) in the system need to achieve consensus. In accordance with an example embodiment of the present invention, a leader node is elected or assigned to manage the consensus protocol. When, for example, a new node is being provisioned, a message would be sent to any node in the system 100 which forwards the request to the leader node. The leader node in turn transmits out the request for approval and when a majority of nodes have responded in the affirmative, the request is allowed. At this point an additional message is sent by the leader node to all nodes informing them that the proposal succeeded. Additionally, each of the nodes will document the change in their respective local copy of the ledger in a fashion that is known to be correct and verifiable. Otherwise, if a consensus is not reached, the request is denied.

In accordance with an example embodiment of the present invention, when the system 100 is configured with multiple nodes, data can be sliced across multiple collections. In the single-node examples, data may or may not have been sliced, but because there was only the one node all interaction with the database engine 110 would be the same. As a system scales to multiple nodes, any given node may have a node policy that grants access to only a subset of the data slices. This means that the local data store(s) would only have access to that subset and the local context graph and could only correlate to that subset content. For example, if a user is connected to a node and requests access to data not stored at that node, then either the request must be relayed or the user must re-connect to a node that has a local copy of the requested data. As a result, if two nodes are storing disjoint slices then they will rarely communicate with each other in the course of managing data transactions.

In accordance with an example embodiment of the present invention, when a transaction runs, all nodes within the system storing records from the referenced slice(s) must be notified of any changes to maintain their respective ledgers. Additionally, by the time of commit any changes to the context graph at a single node, the changes must be propagated to all other nodes, although this can happen asynchronously. Additionally, a multiple node system also provides additional avenues for physical data segmentation. For example, when records are mapped to slices and when any given node is responsible for only a subset of slices, then this has the effect of segmenting groups of data and defining where information is both stored and allowed to flow.

Figure 4:
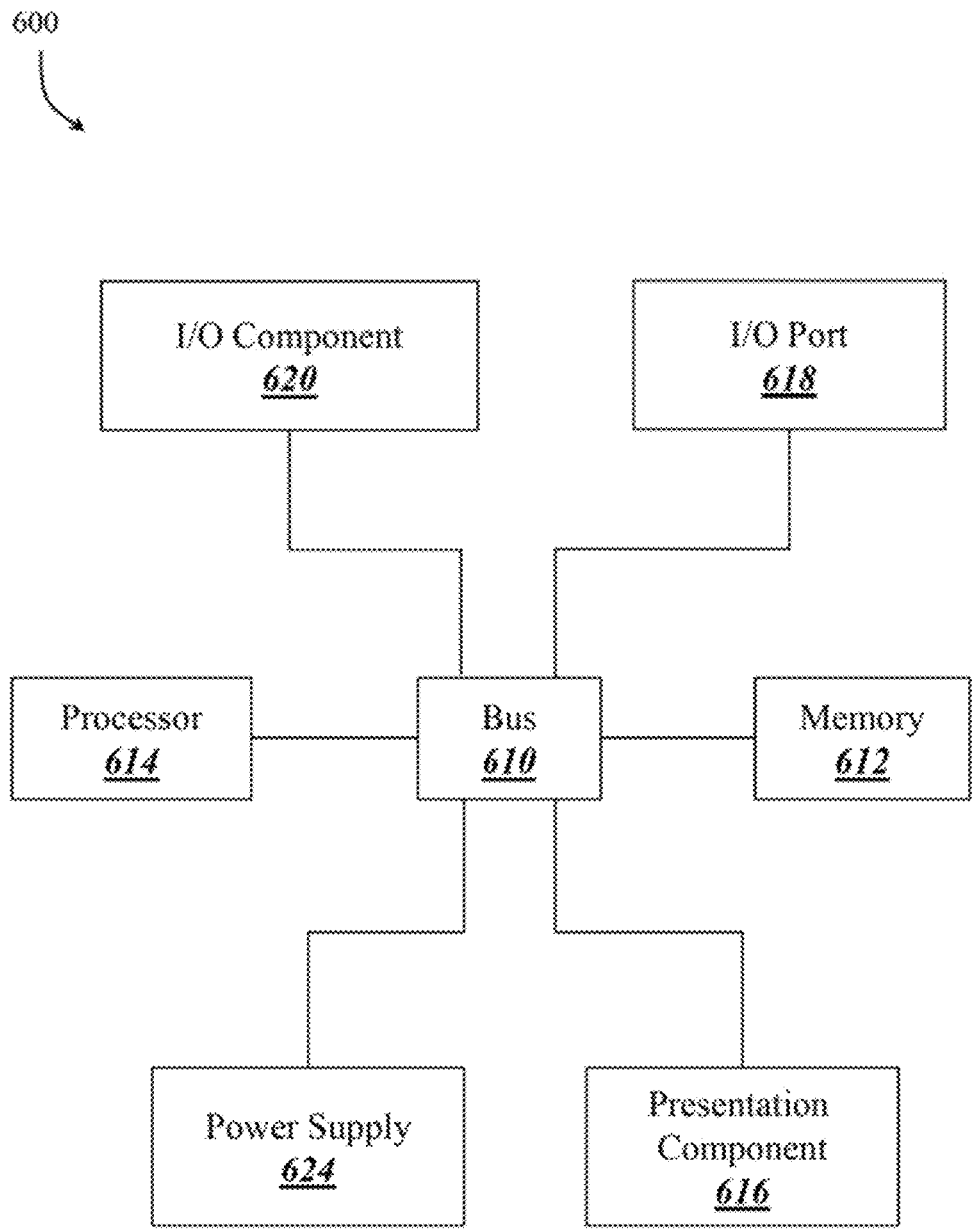
FIG. 4 is a diagrammatic illustration of a high level architecture for implementing processes in accordance with aspects of the invention.

Any suitable computing device can be used to implement the nodes 102 and stores 104 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 600 is depicted in FIG. 4. The computing device 600 is merely an illustrative example of a suitable computing environment and in no way limits the scope of the present invention. A "computing device," as represented by FIG. 4, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 4 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for utilizing a combination of decentralized policy and context to manage segmentation of data in a distributed logical and decentralized service, the method comprising:
    initiating, using one or more networked computing devices, the distributed and decentralized logical service comprising:
        one or more nodes comprising physically independent processes, the one or more nodes each independently associated with a unique node policy dictating attributes and capabilities of an associated node, the unique node policy stored locally at the associated node;
    managing a record within the distributed logical service, the managing comprising, one of the one or more nodes:
        creating, by the node, the record and capturing context for the record at creation at a node, the context comprising a location of a node of the one or more nodes where the data was created, a time the data was created, and a user that created the data;
        storing, by the node, the record in a collection at the node and storing the context as a graph node within a context graph structure stored at the node physically separately from the record stored at the node;
        receiving a request from a user, through the node, for executing a data transaction involving the record;
        validating, by the node using the unique node policy of the node stored at the node, the request for the data transaction;
        performing, by the node, the data transaction for the record at the node; and
        automatically capturing, by the node, context for the data transaction and storing, by the node, new context information resulting from the data transaction or a different transaction in the context graph structure stored at the node, the context comprising a location of a node of the one or more nodes where the data transaction occurred, a time the data transaction occurred, what the data transaction was, and a user that requested the data transaction; and
    wherein the unique node policy associated with and stored at each node and a captured context of one or more data transactions limit which target data the nodes can access and which tasks the node can perform on the target data.

2. The method of claim 1, wherein the context graph structure is stored and maintained as a first-class data-set.

3. The method of claim 1, wherein the context further comprises operator specified fields, or a subset of record data, for defining types of meta-data to capture.

4. The method of claim 1, wherein the transaction comprises at least one of creation of a new record in a collection of records, inserting a new record into an existing collection of records, reading the record, and modifying the record.

5. The method of claim 1, wherein the new context information in the context graph structure represents a new version of the record or an entirely new record.

6. The method of claim 1, further comprising one or more databases comprising one or more collections comprising data records, storing data accessed through the various nodes using one or more data services to store the one or more collections comprising the data records on physical media, each of the one or more databases being associated with a database policy dictating rules for interacting with data stored in that database.

7. The method of claim 1, wherein the data transaction for the record at the node is propagated to each of the one or more nodes.

8. The method in claim 1, wherein the context graph structure for the record captures historical information about how that record has been created, modified, and/or read.

9. The method of claim 1, further comprising provisioning the one or more nodes, using one or more networked computing devices, the provisioning comprising:
    receiving an instruction to provision, and provisioning an initial node with an initial policy;
    receiving, from an operator, using one or more networked computing devices, an instruction to create and creating a node identity associated with the initial node;
    the initial node automatically creating a ledger showing a membership with the node identity of the initial node for storage with the initial node;
    receiving an instruction to provision, and provisioning, at least one additional node with a second unique policy and a second node identity;
    the at least one additional node transmitting the second unique policy and the second node identity of the at least one additional node to all nodes in the membership;
    the at least one additional node receiving approval and entry credentials from the membership; and
    the at least one additional node creating a copy of the ledger for storage with the at least one additional node;
    each node in the membership automatically updating the membership in their respective ledgers to include the entry credentials of the at least one additional node; and
    establishing, by the at least one additional node, connections to all existing nodes in the membership;
    wherein a role of the at least one additional node is enforced by the single logical service based on the second unique policy;
    wherein the initial node and the at least one additional node act as the single logical service with the initial policy and the second unique policy for managing data in a one or more databases.

10. The method of claim 6, further comprising provisioning the one or more databases using one or more networked computing devices, the provisioning comprising:
    receiving, by a membership of nodes, a request for a proposed database policy through a node within the single logical service;
    determining, by the membership of nodes, to allow a new database with the requested proposed database policy;

capturing, by the membership of nodes, approval of the new database in a distributed ledger; and providing access to a plurality of nodes within the single logical service for the new database.

11. The method of claim 10, wherein the requested proposed database policy comprises a name and initial behaviors for the one or more databases.

12. The method of claim 10, wherein the one or more databases comprises:
one or more collections of data logically grouped by name; and
wherein the one or more collections each includes one or more records comprising a list of one or more name-value pairs.

13. The method of claim 12, wherein the one or more collections of data are mapped to one or more slices to create a physical grouping of the one or more records.

14. The method of claim 12, wherein a collection of context is utilized by the membership of nodes in accordance with policies associated with the nodes to determine whether individual data requests should be allowed or denied.

15. The method of claim 10, wherein the database policy in combination with the node policy combine to define which data records and what type of data is accessible from each node of the plurality of nodes.

16. The method of claim 9, wherein each of the initial node and the at least one additional node include a copy of the ledger including the membership.

17. The method of claim 9, wherein the membership comprises an identity and location for each of the nodes within the single logical service.

18. The method of claim 9, wherein the node identity comprises a public key and private key pair.

19. The method of claim 9, wherein approval of the at least one additional node results from a consensus algorithm run by the membership.

20. The method of claim 9, further comprising:
requesting, by an operator of at least one node of the membership using one or more networked computing devices, a change of the node policy associated with the at least one node;
executing, by all nodes of the membership, a consensus algorithm to approve the requested change of the node policy; and
changing, upon approval, the ledger to reflect the change of the node policy.

21. The method of claim 9, wherein policies dictate how data must be governed by nodes enforcing the policies.

22. The method of claim 9, wherein policies of nodes are created in a least privilege model.

23. The method of claim 9, wherein each of the one or more nodes in the membership stores a copy of the node policies for each other node in the membership.

24. The method in claim 23, wherein a service defined by the membership manages the segmentation of data in a distributed logical service enabling the one or more collections of records to be stored at each of the one or more nodes in the membership, and enabling a transaction node to execute a data transaction comprising accessing one or more records stored at one or more of each other node in the membership or the transaction node executing the transaction.

25. The method in claim 24, wherein the node policy of the transaction node executing the transaction and the context corresponding to the one or more records defines whether each of one or more target records are permitted to flow to the transaction node, wherein each other node in the membership in a location where the one or more target records are stored sends the one or more target records stored to the transaction node executing the transaction only if the one or more target records are permitted to flow to that transaction node.

26. A system for utilizing a combination of decentralized policy and context to manage segmentation of data in a distributed and decentralized logical service, the system comprising:
one or more networked computing devices comprising memory, one or more processors and input/output components, configured to initiate the distributed and decentralized logical service comprising:
one or more nodes comprising physically independent processes, the one or more nodes each independently associated with a unique node policy dictating attributes and capabilities of an associated node, the unique node policy stored locally at the associated node, wherein each node comprises:
a database engine configured to access and exchange instructions with one or more external data stores or one or more internal data stores, for managing a record within the distributed logical service, the managing comprising:
a policy engine configured to:
create the record and capturing context for the record at creation, the context comprising a location of a node of the one or more nodes where the data was created, a time the data was created, and a user that created the data;
store the record in a collection at the node and storing the context as a graph node within a context graph structure stored at the node physically separately from the record stored at the node;
receive a request, through the node and transmitted from a user device using a network connection, for executing a data transaction involving the record;
validate, by the unique node policy of the node stored at the node, the requested data transaction, by determining whether the requested data transaction complies with the unique node policy and database policies, which dictates what operations the node can execute and what actions each database can perform;
an admin-consensus engine configured to manage polling by execution of a distributed consensus algorithm;
the database engine of the node configured to perform the data transaction for the record at the node; and
the policy engine of the node configured to automatically capture context for the data transaction and store new context information resulting from the data transaction or a different transaction in the context graph structure, the context comprising a location of a node of the one or more nodes where the data transaction occurred, a time the data transaction occurred, what the data transaction was, and a user that requested the data transaction;
wherein the unique node policy associated with and stored at each node and a captured context of a data transaction limit which target data the node can access and which tasks the node can perform on the target data.

* * * * *